United States Patent
Doi et al.

(10) Patent No.: US 6,809,631 B2
(45) Date of Patent: Oct. 26, 2004

(54) DATA TRANSMITTING AND RECEIVING METHOD AND PORTABLE COMMUNICATION TERMINAL APPARATUS

(75) Inventors: Miwako Doi, Kawasaki (JP); Jota Suzuki, Yokohama (JP); Yutaka Sata, Tokyo (JP); Noriyasu Kato, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 519 days.

(21) Appl. No.: 09/907,949

(22) Filed: Jul. 19, 2001

(65) Prior Publication Data

US 2002/0010603 A1 Jan. 24, 2002

(30) Foreign Application Priority Data

Jul. 19, 2000 (JP) ........................................ 2000-219445

(51) Int. Cl.[7] .......................... G08C 19/00; H04Q 9/00; G06F 17/60
(52) U.S. Cl. ........................................ 340/5.86; 705/14
(58) Field of Search .............................. 340/5.64, 5.86; 235/384, 375, 382; 705/13, 14

(56) References Cited

U.S. PATENT DOCUMENTS

| | | | | |
|---|---|---|---|---|
| 4,811,377 A | * | 3/1989 | Krolopp et al. .......... 455/550.1 |
| 5,740,369 A | * | 4/1998 | Yokozawa et al. .......... 709/217 |
| 5,842,122 A | * | 11/1998 | Schellinger et al. ........ 455/403 |
| 6,490,443 B1 | * | 12/2002 | Freeny, Jr. .................. 455/406 |
| 2001/0042021 A1 | * | 11/2001 | Matsuo et al. ................ 705/26 |
| 2002/0107054 A1 | * | 8/2002 | Fujisawa et al. ............ 455/573 |
| 2003/0163373 A1 | * | 8/2003 | Cornateanu .................. 705/14 |

* cited by examiner

Primary Examiner—Brian Zimmerman
Assistant Examiner—Scott Au
(74) Attorney, Agent, or Firm—Oblon, Spivak, McClelland, Maier & Neustadt, P.C.

(57) ABSTRACT

A data transmitting and receiving method applied to a portable communication terminal apparatus which communicates with at least one destination and a ticket gate, the method comprising receiving a ticket information item via a public network to obtain a plurality of received ticket information items, storing the received ticket information items in a memory device, designating one of the ticket information items in the memory device to obtain a designated ticket information item, displaying the designated ticket information item on a display, establishing a first radio channel for the portable communication terminal apparatus to perform communications with the ticket gate, in preference to other communications with the destination, releasing a second radio channel which is used for communicating with the destination, before establishing the first radio channel, communicating with the ticket gate via the first radio channel on the basis of the ticket information item displayed on the display.

16 Claims, 8 Drawing Sheets

| Ticket | Designated date | Service type | Purchase date | Contents |
|---|---|---|---|---|
| T1 | 00.11.04.h1.m1 | ASP1 | 00.10.05.13:00 | PR1 |
| T2 | 00.12.02.h2.m2 | ASP2 | 00.11.03.13:00 | PR2 |
| T3 | 00.12.25.h3.m3 | ASP3 | 00.11.26.13:00 | PR3 |
| ⋮ | ⋮ | ⋮ | ⋮ | ⋮ |

FIG. 4A

| Ticket | Designated date | End date | Service type | Purchase date | Contents |
|---|---|---|---|---|---|
| T101 | 00.09.24.h4.m4 | NULL | ASP1 | 00.08.30.13:00 | PR1 |
| T102 | 00.09.25.h5.m5 | NULL | ASP2 | 00.08.30.14:00 | PR2 |
| T103 | 00.09.26.h6.m6 | 01.09.25.h7.m7 | ASP3 | 00.08.30.14:30 | PR3 |
| ⋮ | ⋮ | ⋮ | ⋮ | ⋮ | ⋮ |

FIG. 4B

| Ticket | Designated date | Service type | Purchase date | Contents | Ticket examination for admission |
|---|---|---|---|---|---|
| T1 | 00.11.04.h7.m7 | ASP1 | 00.10.05.13.00 | PR1 | ST1 |
| T2 | 00.12.02.h8.m8 | ASP2 | 00.11.15.14.00 | PR2 | NULL |
| T3 | 00.12.25.h9.m9 | ASP3 | 00.11.26.14.00 | PR3 | NULL |
| ⋮ | ⋮ | ⋮ | ⋮ | ⋮ | ⋮ |

| Ticket | Designated date | Service type | Purchase date | Contents | Gate of ticket examination for admission | Date of ticket examination for admission | Gate of ticket examination for exit | Date of ticket examination for exit |
|---|---|---|---|---|---|---|---|---|
| T1 | 00.11.04.h1.m1 | ASP1 | 00.10.05.13:00 | PR1 | ST1 | 00.11.04.h4.m4 | St1 | 00.11.04.h5.m5 |
| T2 | 00.12.02.h2.m2 | ASP2 | 00.11.03.13:00 | PR2 | NULL | NULL | NULL | NULL |
| T3 | 00.12.25.h3.m3 | ASP3 | 00.12.26.13:00 | PR3 | NULL | NULL | NULL | NULL |
| ... | ... | ... | ... | ... | ... | ... | ... | ... |

FIG. 9B

| Ticket | Designated date | Service type | Purchase date | Contents | Gate of ticket examination for admission | Date of ticket examination for admission | Gate of ticket examination for exit | Date of ticket examination for exit |
|---|---|---|---|---|---|---|---|---|
| T2 | 00.12.02.h2.m2 | ASP2 | 00.11.03.13:00 | PR2 | NULL | NULL | NULL | NULL |
| T3 | 00.12.25.h3.m3 | ASP3 | 00.12.26.13:00 | PR3 | NULL | NULL | NULL | NULL |
| ... | ... | ... | ... | ... | ... | ... | ... | ... |

FIG. 10

| Ticket | Designated date | Service type | Purchase date | Contents | Gate of ticket examination for admission | Date of ticket examination for admission | Gate of ticket examination for exit | Date of ticket examination for exit |
|---|---|---|---|---|---|---|---|---|
| T1 | 00.11.04.h1.m1 | ASP1 | 00.10.05.13:00 | PR1 | ST1 | 00.11.04.h4.m4 | St1 | 00.11.04.h5.m5 |
| ... | ... | ... | ... | ... | ... | ... | ... | ... |
| ... | ... | ... | ... | ... | ... | ... | ... | ... |
| ... | ... | ... | ... | ... | ... | ... | ... | ... |

DATA TRANSMITTING AND RECEIVING METHOD AND PORTABLE COMMUNICATION TERMINAL APPARATUS

CROSS-REFERENCE TO RELATED APPLICATIONS

This application is based upon and claims the benefit of priority from the prior Japanese Patent Application No. 2000-219445, filed Jul. 19, 2000, the entire contents of which are incorporated herein by reference.

BACKGROUND OF THE INVENTION

1. Field of the Invention

The present invention relates to a portable communication terminal which performs short range radio communication for ticket examination with a ticket examination apparatus when a user enters/exit a station, a place of event, or the like and a data transmitting/receiving method.

2. Description of the Related Art

For example, at a ticket gate in a station, an automatic ticket examination apparatus is installed, and a ticket or pass formed by magnetically recording an amount and the like on a paper or plastic sheet is inserted into the apparatus to be examined. The mechanical portion of the automatic ticket examination apparatus which mechanically conveys the inserted ticket or pass frequently fails. For this reason, an electronic ticket examination has been proposed to eliminate the need for this mechanical conveyance.

Recently, to realize electronic ticket examination, a method of using common mobile phones has been studied. In this method, ticket examination is performed by using the communication function of a mobile phone, and the fare of a ticket is added to the telephone charge of the mobile phone to make payment. In such a fare paying method using a mobile phone, a service provider must pay nearly 10% of the fare as a handling fee for the payment.

To spare the payment of this handling fee, a method of using a channel based on near-infrared light (IR: Infra Red) mobile phone has been proposed. More specifically, a mobile phone has an IR transceiver capable of communicating with a local IR base station. Since IR is light, an obstacle in-between interferes with transmission/reception. If, for example, the user blocks the transceiver with his/her finger while holding the mobile phone in his/her hand, communication cannot be performed.

There are moves afoot to equip a mobile phone with a communication function based on a radio communication scheme such as Bluetooth, as a short range radio communication function capable of covering only about 10 m, in place of IR. For example, it is expected that 60% of mobile phones will be equipped with Bluetooth by the year 2002. Likewise, it is expected that many personal computers (PCs), PDAs (Personal Digital Assistants), and the like equipped with Bluetooth will be on sale, and many users will use them.

Unlike IR, Bluetooth is a radio scheme, and hence communication is not blocked by an obstacle. In addition, since the specifications of a Bluetooth communication scheme are defined as global standards, telephones can communicate anywhere in the world as long as they are quipped with Bluetooth. There are two main communication schemes for mobile phones in the world: one is used in the U.S. (CDMA-One) and the other is used in Europe (GSM). Hence, mobile phones that can be used in Japan and the U.S. cannot be used in Europe. In contrast to this, Bluetooth allows communication anywhere in the world. In addition, according to Bluetooth, identification numbers are uniquely assigned to all transceivers produced in the world, and hence services can be managed by using two kinds of numbers, i.e., the Bluetooth identification number assigned to the mobile phone of each user and the identification number assigned to each user who uses the services. This makes it possible to provide services with a high degree of security.

A terminal capable of Bluetooth radio communication (to be referred to as a Bluetooth terminal hereinafter) becomes a master or slave depending on the usage of a service when it starts communicating with another nearby Bluetooth terminal.

If, for example, a PC is connected to the Internet through Bluetooth by using a mobile phone (or PDA) as a modem, the Bluetooth function on the PC side becomes a master, and the Bluetooth function on the mobile phone (or PDA) side becomes a slave. When a user wants to listen to MP3 music stored in the memory of a mobile phone (or PDA) with headphones via Bluetooth, the Bluetooth function on the mobile phone (or PDA) side becomes a master, and the Bluetooth function on the headphone side becomes a slave. In this manner, the Bluetooth function of the mobile phone (or PDA) becomes a master or slave.

When this Bluetooth function serves as a master, this Bluetooth terminal can communicate with another Bluetooth terminal by establishing a connection with it in response to an inquiry therefrom. When, however, the Bluetooth function is a slave, the Bluetooth terminal cannot serve as a master and communicate with another Bluetooth terminal.

When automatic ticket examination is to be performed by using a mobile phone (or PDA) having a Bluetooth communication function, a connection (radio channel) must be established between the Bluetooth function on the mobile phone (or PDA) side and the Bluetooth function on the ticket examination apparatus (ticket gate) regardless of which side is serving as a master or slave.

A mobile phone (or PDA) may be communicating with another Bluetooth terminal (for example, it may be communicating with headphones or a PC) at the time of ticket examination. In this case, since the Bluetooth function on the mobile phone (or PDA) side can be a master or slave, a communication connection cannot be easily established between the ticket examination apparatus (ticket gate) and the mobile phone (or PDA).

To facilitate the establishment of a communication connection between the ticket examination apparatus (ticket gate) and the mobile phone (or PDA), the simplest way is to suspend the communication connection currently established for the mobile phone (or PDA) regardless of the situation (a master or slave) on the mobile phone (or PDA) side.

It is very troublesome for the user to perform a special operation on the mobile phone (or PDA) to disconnect/terminate the connection at the time of ticket examination. In addition, since the necessity to disconnect/terminate a connection is unique to Bluetooth, it is difficult for the user to recognize the necessity of the special operation.

As described above, to perform automatic ticket examination by using a portable communication terminal such as a mobile phone (or PDA) having a Bluetooth communication function, a connection must be established between the ticket examination apparatus (ticket gate) and the portable communication terminal. For this purpose, the user must take the troublesome step of disconnecting/terminating the Bluetooth connection that has already been established for the portable communication terminal at the time of ticket examination. This imposes a great burden on the user.

BRIEF SUMMARY OF THE INVENTION

It is an object of the present invention to provide a data transmitting/receiving method which can easily start data transmission/reception for ticket examination or the like by short range radio communication using a portable communication terminal without imposing a burden on a user, and a portable communication terminal using the method.

According to an aspect of the present invention, there is provided a data transmitting and receiving method applied to a portable communication terminal apparatus which communicates with at least one destination and a ticket gate, the method comprising: receiving a ticket information item via a public network to obtain a plurality of received ticket information items; storing the received ticket information items in a memory device; designating one of the ticket information items in the memory device to obtain a designated ticket information item; displaying the designated ticket information item on a display; establishing a first radio channel for the portable communication terminal apparatus to perform communications with the ticket gate which examines the ticket information item displayed on the display, in preference to other communications with the destination; releasing a second radio channel which is used for communicating with the destination, before establishing the first radio channel; communicating with the ticket gate via the first radio channel on the basis of the ticket information item displayed on the display.

According to an aspect of the present invention, there is provided a portable communication terminal apparatus which communicates with at least one destination and a ticket gate, comprising: a receiver which receives a ticket information item via a public network to obtain a plurality of received ticket information items; a memory device configured to store the received ticket information items; a designation device which designates one of the ticket information items stored in the memory device to generate a designated ticket information item; a display configured to display the designated ticket information item; a radio channel establishing device which establishes a first radio channel to perform communications with the ticket gate which examines the ticket information item displayed on the display, in preference to other communications with the destination; a radio channel releasing device configured to release a second radio cannel which is used for communicating with the destination, before establishing the first radio channel; a communication device configured to communicate with the ticket gate via the first radio channel on the basis of the ticket information item displayed on the display.

BRIEF DESCRIPTION OF THE SEVERAL VIEWS OF THE DRAWING

FIGS. 4A to 4C are views each showing an example of how pieces of ticket information are stored in a ticket information storage of the portable communication terminal;

FIGS. 9A and 9B are views each showing an example of how pieces of ticket information are stored in the ticket information storage of the portable communication terminal; and FIG. 10 is a view showing an example of how a log of deleted ticket information is stored in a memorandum storage of the portable communication terminal.

DETAILED DESCRIPTION OF THE INVENTION

Embodiments of the present invention will be described below with reference to the views of the accompanying drawing.

Note that checking a ticket when a person enters or exits a station, theater, place of event, or the like will be referred to as ticket examination, and ticket examination at the time of entrance and ticket examination at the time of exit will be referred to as ticket examination for admission and ticket examination for exit, respectively.

Figure 1:
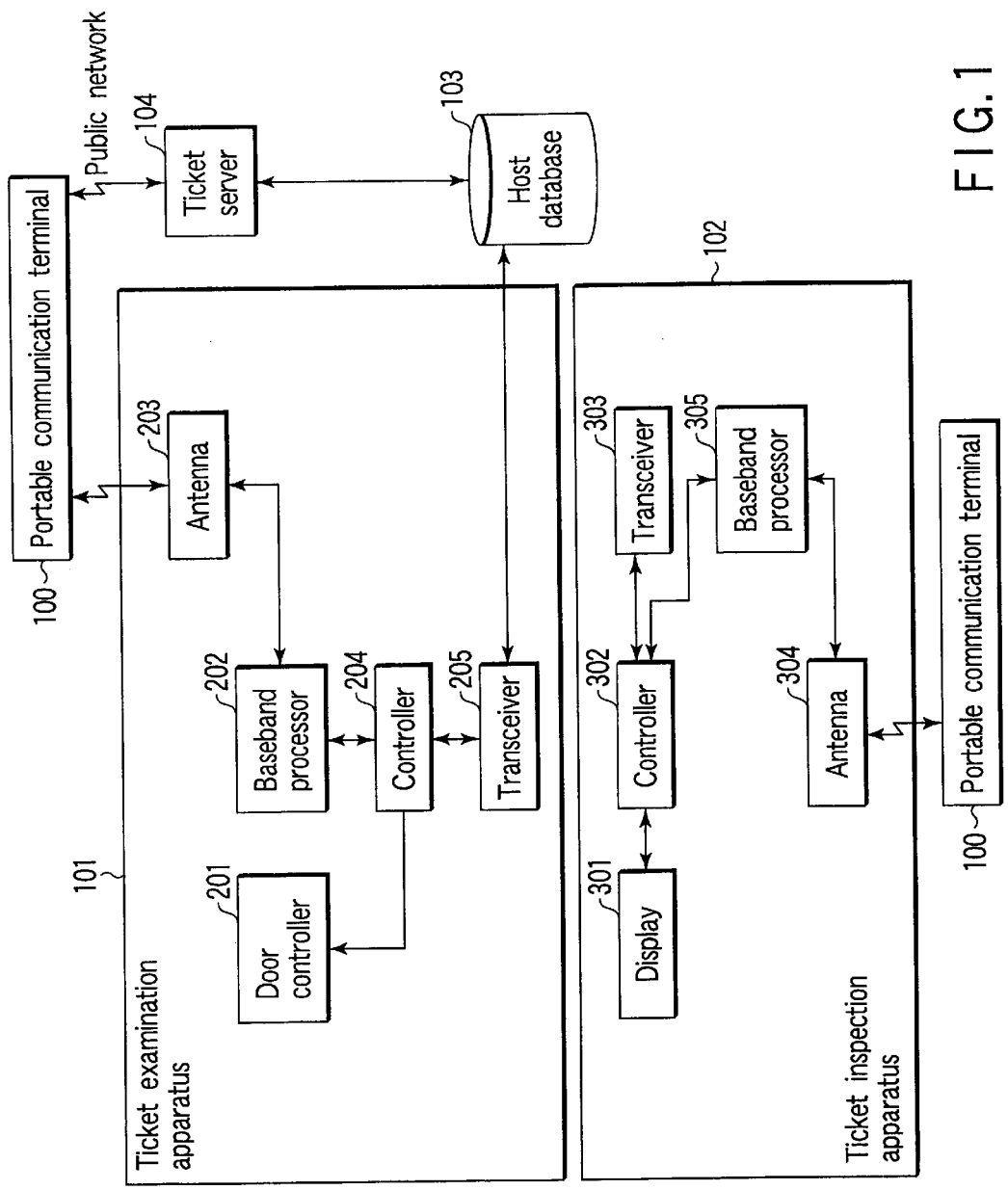
FIG. 1 is a block diagram showing an example of the arrangement of a ticket examination system according to embodiments of the present invention.

FIG. 1 shows an example of the arrangement of a ticket examination system according to the first and second embodiments of the present invention. This ticket examination system performs ticket examination for admission/exit with respect to a station, place of event, or the like by using a portable communication terminal (e.g., a mobile phone or PDA, which will be simply referred to as a portable terminal hereinafter) having the function of performing communication by connecting to a public network and the radio communication function of performing radio communication by establishing a radio channel with a distant apparatus independently of the public network.

This ticket examination system is mainly comprised of a portable terminal 100 held by each user, a ticket examination apparatus 101, a ticket server 104, and a host database (DB) 103. The system may also include a ticket inspection apparatus 102 and fare adjustment apparatus 105, as needed.

The ticket examination apparatus 101 is a ticket gate installed at an entrance/exit in a station or place of event. When a user passes through this gate, a radio channel is established between the portable terminal 100 held by the user and the ticket examination apparatus (ticket gate) 101, and the ticket examination apparatus 101 and portable terminal 100 transmit/receive data for ticket examination processing through this radio channel.

The ticket server 104 is managed by a service provider that sells tickets, and provides ticket sales services for users through the Internet via a public network (mobile phone network).

The user dials a predetermined telephone number with the portable terminal 100 to access the ticket server 104 through, for example, the Internet via a public network. The user then orders a desired ticket and purchases it. The user may pay for the ticket by prompt payment through the public network and Internet, direct debit, or payment with a telephone charge. In any case, this payment method is irrelevant to the gist of the present invention, and a description thereof will be omitted. When processing associated with payment of the charge with the portable terminal 100 is properly terminated, the ticket server 104 transmits data (an electronic ticket to be referred to as ticket information) as a purchased ticket that certifies the right to enter a station or place of event. The portable terminal 100 stores the received ticket information in a ticket information storage 4 (see FIG. 4).

As shown in FIG. 1, the ticket examination apparatus (ticket gate) 101 is comprised of an antenna 203 for performing short range radio communication with the portable terminal 100 by using the Bluetooth function, a baseband processor 202 for executing baseband processing specified in Specification of the Bluetooth System Version 1.0 or the like, a transceiver 205 for communicating with the host DB 103, a door controller 201, and a controller 204.

The door controller 201 opens/closes the gate to let the user pass there through when entrance/exit of the portable terminal 100 is permitted as a result of communicating with the portable terminal 100 through the antenna 203 and baseband processor 202 and executing predetermined ticket examination processing.

The controller 204 controls each component described above and executes predetermined ticket examination processing and the like.

The ticket inspection apparatus 102 is held by, for example, a ticket inspector to check the ticket information stored in the portable terminal 100 of the user who has entered a station through an ticket gate and got on an electric train.

As shown in FIG. 1, the ticket inspection apparatus 102 is comprised of an antenna 304 for performing short range radio communication with the portable terminal 100 by using the Bluetooth function, a baseband processor 305 for executing baseband processing specified in Specification of the Bluetooth System Version 1.0 or the like, a transceiver 303 for communicating with the host DB 103, a display 301, and a controller 302.

The display 301 displays the result obtained by executing predetermined ticket inspection processing upon communicating with the portable terminal 100 through the antenna 304 and baseband processor 305. For example the display 301 display information indicating whether the ticket information displayed on the portable terminal 100 is valid or not.

The controller 302 controls each component described above and executes predetermined ticket inspection processing and the like.

Figure 2:
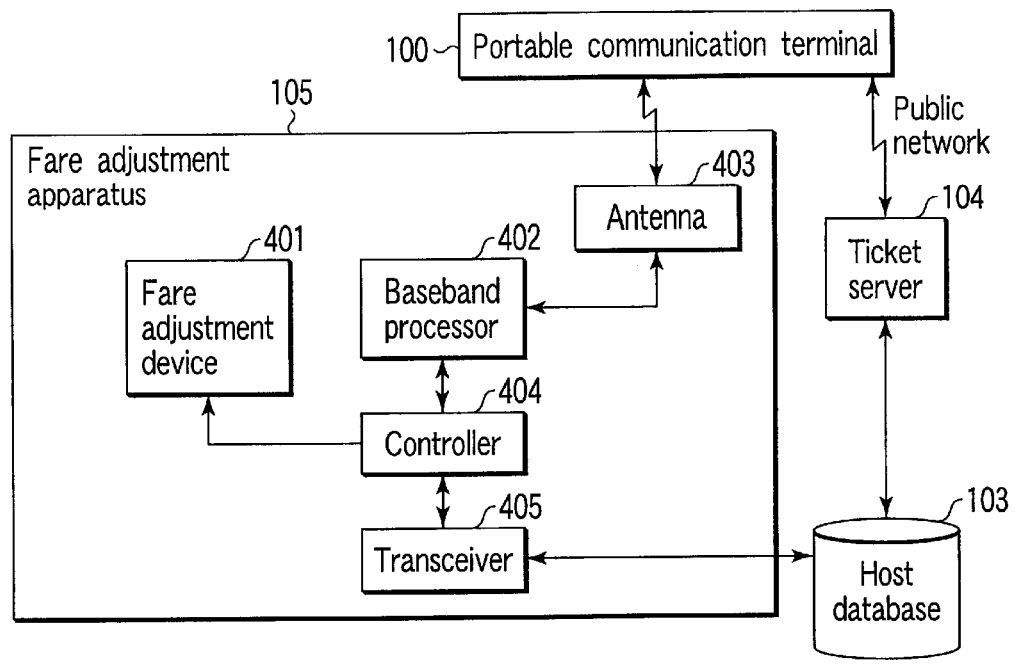
FIG. 2 is a block diagram showing an example of the arrangement of a ticket examination system according to embodiments of the present invention.

The fare adjustment apparatus 105 shown in FIG. 2 is designed to perform fare adjustment with respect to, for example, ticket information that has expired and not been used, ticket information to be canceled, or the like by using a radio channel to the portable terminal 100 and return the adjusted amount.

As shown in FIG. 2, the fare adjustment apparatus 105 is comprised of an antenna 404 for performing short range radio communication with the portable terminal 100 by using the Bluetooth function, a baseband processor 402 for executing baseband processing specified in the Specification of the Bluetooth System Version 1.0 or the like, a transceiver 405 for communicating with the host DB 103, a fare adjustment device 401, and a controller 404.

The fare adjustment device 401 calculates an adjustment amount or the like by communicating with the portable terminal 100 through the antenna 403 and baseband processor 402 and gives a refund or demands for payment of a deficit.

The controller 404 controls each component described above and executes predetermined fare adjustment processing such as calculation of an adjustment amount.

The host DB (database) 103 in FIGS. 1 and 2 is connected to the ticket server 104, ticket examination apparatus 101, ticket inspection apparatus 102, and fare adjustment apparatus 105 through, for example, a leased line or public network. The host DB 103 receives processing logs and stores them. The host DB 103 stores part or all of the following pieces of information received as processing logs: purchased ticket information, examined ticket information, fare-adjusted ticket information, and inspected ticket information, upon classifying the information for each user of the portable terminal 100 or each Bluetooth identification number. The host DB 103 manages the above data to allow them to be used for checking a usage state, payment of charges, and the like.

Terminals capable of Bluetooth radio communication (terminals equipped with Bluetooth communication functions), e.g., the portable terminal 100, ticket examination apparatus 101, ticket inspection apparatus 102, and fare adjustment apparatus 105, will be referred to as Bluetooth terminals hereinafter. For example, the user can listen to MP3 music stored in the memory of the portable terminal 100 or the like with a headset as a Bluetooth terminal through Bluetooth by radio-connecting the headset to the portable terminal 100 through Bluetooth.

Assume that in the following embodiments, when data required for ticket examination, ticket inspection, fare adjustment, and the like for ticket information is to be transmitted/received between Bluetooth terminals, e.g., the ticket server 104 and the portable terminal 100, this transmission/reception data is encrypted to prevent a malicious third party from easily tampering with the data. Assume that data required for ticket examination, ticket inspection, fare adjustment, and the like for ticket information is encrypted with key information shared between Bluetooth terminals, e.g., the ticket server 104 and the portable terminal 100. Encrypted ticket information is stored in the ticket information storage 4 of the portable terminal 100. When ticket information is to be displayed on the portable terminal 100, the ticket information read out from the ticket information storage 4 is decrypted by a controller 9 using the corresponding key information, and the resultant information is displayed on a display 6. Upon reception of the encrypted data from the portable terminal 100, the ticket examination apparatus 101, ticket inspection apparatus 102, and fare adjustment apparatus 105 perform ticket examination, ticket inspection, fare adjustment, and the like upon decrypting the data in the controllers 204, 302, and 404 using the corresponding key information.

Note that this encryption/decryption of ticket information is irrelevant to the gist of the present invention, and hence a description thereof will be omitted.

(First Embodiment)

Figure 3:
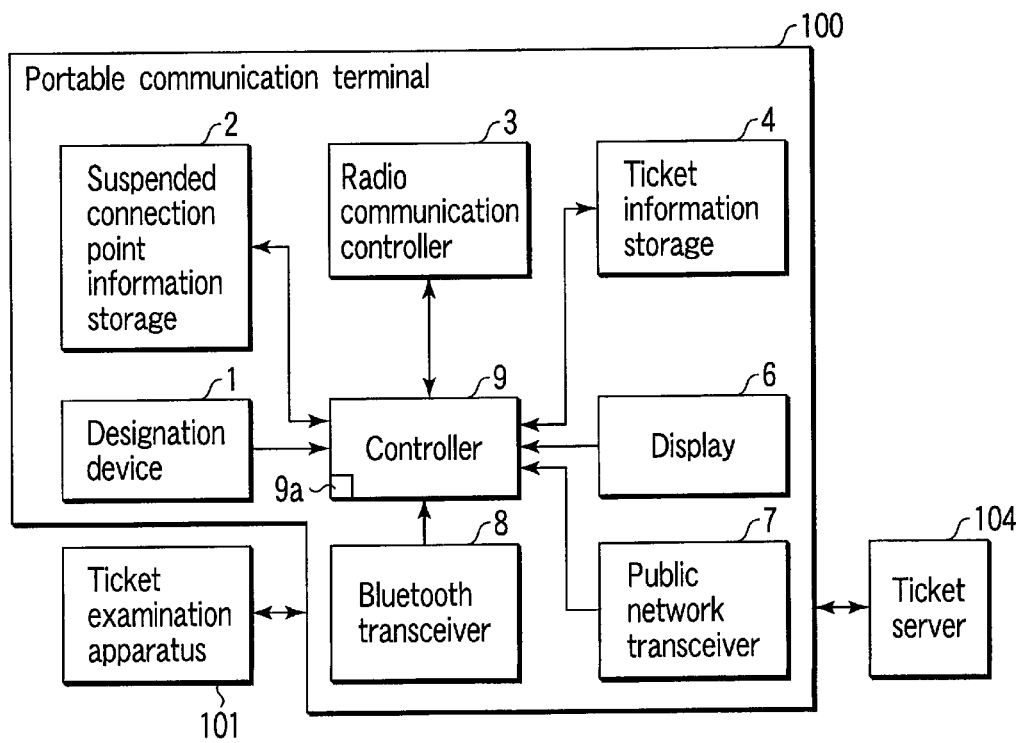
FIG. 3 is a block diagram showing an example of the arrangement of a portable communication terminal.

FIG. 3 shows an example of the arrangement of a portable terminal 100 used in a ticket examination system according to the first embodiment. The portable terminal 100 is comprised of a designation device 1, suspended connection point information storage 2, radio communication connection controller 3, ticket information storage 4, display 6, public network transceiver 7, short range radio communication transceiver (Bluetooth transceiver) 8, and controller 9.

Figure 7:
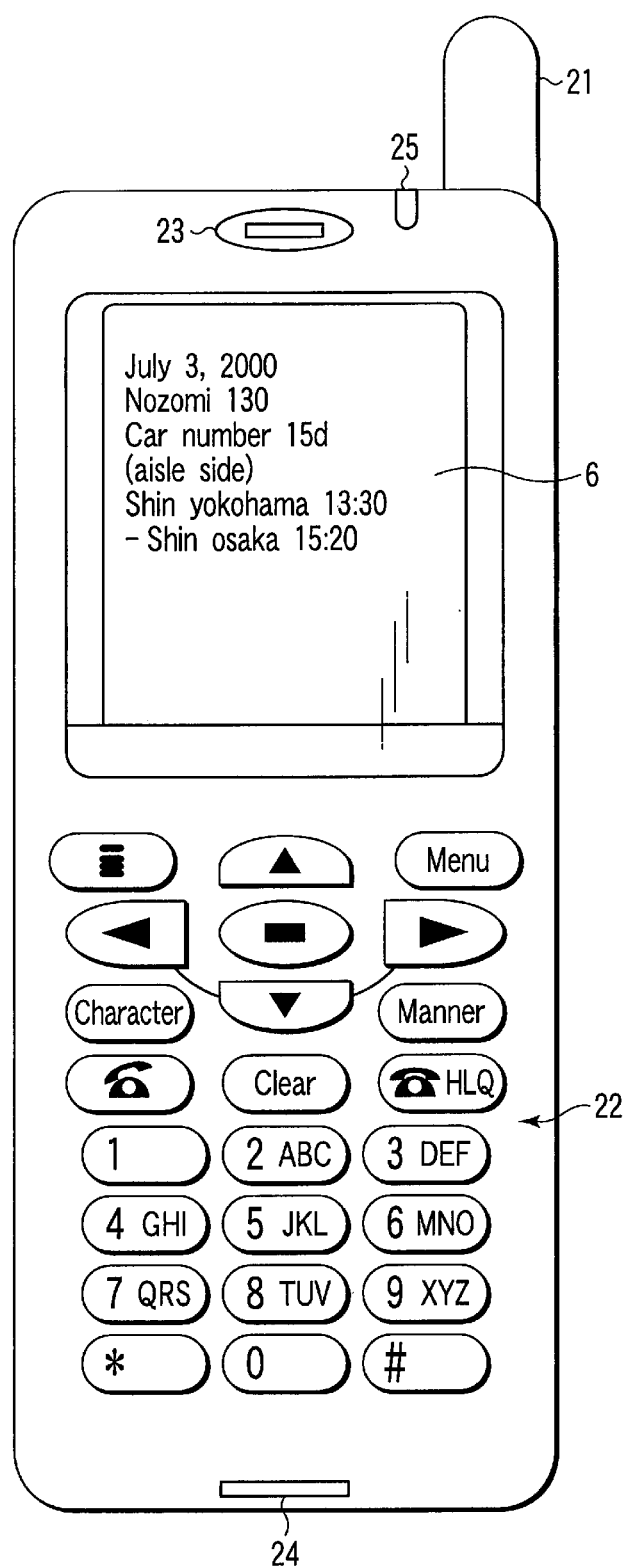
FIG. 7 is a view showing the outer appearance of the portable communication terminal and an example of display of ticket information on a display.

FIG. 7 shows an example of the outer appearance of the portable terminal 100. As shown in FIG. 7, the portable terminal 100 includes the display 6 formed by, for example, a liquid crystal panel, a key input device 22 for inputting terminal telephone numbers, characters, and various instructions, a receiver loudspeaker 23 and transmitter microphone 24 which are used for voice communication with a distant terminal connected through a public network, a receiver lamp 25 that blinks at the time of reception of call, and an antenna 21 for performing Bluetooth communication and communication by connecting to a mobile phone network. Note that the designation device 1 in FIG. 3 corresponds to the key input device 22 in FIG. 7.

Referring back to FIG. 3, the public network transceiver 7 connects the portable terminal 100 to the public network to perform transmission/reception, thus making the portable terminal 100 serve as a general telephone.

The short range radio communication transceiver (Bluetooth transceiver) 8 establishes a radio channel between the portable terminal 100 and a Bluetooth terminal such as a ticket examination apparatus (ticket gate) 101 installed at an entrance/exit in a station or place of event, a ticket inspection apparatus 102, or a fare adjustment apparatus 105 by Bluetooth, and transmits/receives data for various processes, e.g., ticket examination, ticket inspection, and fare adjustment using the ticket information stored in the ticket information storage 4.

The Bluetooth transceiver 8 is comprised of an antenna for radio communication in a 2.4 GHz band, a baseband device, a protocol controller, e.g., L2 CAP (Logical Link Control and Adaptation Protocol), specified in, for example, the Specification of the Bluetooth System Version 1.0, and the like.

Consider the arrangement shown in FIG. 1 in exchanging data with the ticket examination apparatus 101. When a user approaches an entrance/exit (a ticket gate such as the ticket examination apparatus 101) to get on/off a train or enter (exit) a place of event, the user instructs the portable terminal 100 through the designation device 1 to display the contents of ticket information so as to check the ticket information to be used for ticket examination. The specific ticket information designated by the designation device 1 is sent to the controller 9. The controller 9 reads out the corresponding ticket information from the ticket information storage 4 and displays part of or all of the ticket information on the display 6 of the portable terminal 100 to prompt the user check the contents of the ticket information.

Various procedures for letting the user check ticket information to be used for ticket examination are conceivable in addition to the above procedure. For example, the user selects an item for displaying a list of ticket from the menu displayed on the display 6. A list of ticket information currently stored in the ticket information storage 4 is then displayed on the display 6. This list may take any form as long as the user can check what kinds of ticket are stored in the ticket information storage 4 from the list. When the user selects desired ticket information from the list (i.e., the user gives an instruction to display selected ticket information), the controller 9 reads out the designated ticket information from the ticket information storage 4 and displays part of or all of the ticket information on the display 6 of the portable terminal 100 to prompt the user to check the contents of the ticket information. Note that this list of ticket information may be a list of information that allows the user to check the contents of the respective ticket information. There is also provided a method of sparing the operation of selecting an item from a menu by providing the mobile phone with a shortcut key (e.g., a ticket key) for facilitating operation.

Note that the ticket information designated by the user is displayed on the display 6 to allow the user to check the contents of the ticket information to be used. In performing ticket examination using an electronic ticket, it is essential for the portable terminal 100 to display the contents of ticket information on the display 6. As ticket information checking operations, various operations are conceivable, e.g., using sounds, in addition to displaying ticket information in the above manner.

When the user gives an instruction through the designation device 1 to display selected ticket information (or selects a desired one from a list that allows the user to check the contents of the respective ticket information), the controller 9 receives the instruction and activates the radio communication connection controller 3.

If the Bluetooth transceiver 8 is communicating with a Bluetooth terminal other than the ticket examination apparatus 101 at the time of ticket examination, the radio communication connection controller 3 stores information such as the identification number of the Bluetooth terminal with which the portable terminal 100 is communicating at the time of ticket examination, in the suspended connection point information storage 2, to allow the Bluetooth transceiver 8 to resume the communication afterward. In addition, the radio communication connection controller 3 performs predetermined processing to suspend the communication (set the Bluetooth function in a state where no radio channel (link) is established (Standby mode)).

Each of FIGS. 4A to 4C shows an example of how pieces of ticket information are stored in the ticket information storage 4.

FIG. 4A shows an example of how pieces of ticket information whose use dates are fixed, e.g., seat reservation information, are stored. The "ticket" field contains identification information (T1, T2, . . . ) indicating what kind of ticket (e.g., a railroad ticket, airline ticket, or theme park ticket) the purchased ticket information is. The "designated date" field contains the date and time when each ticket will be used. For example, the designated date of the ticket information with the identification information "T1" is "00. 11. 04. h1. m1" (Nov. 4, 2000,h1 o'clock m1 minute). For seat reservation information such as railroad or airline ticket information, time information indicating a specific hour and minute is stored in addition to date information. With regard to a ticket for which only date information is valid, e.g., a theme park ticket, for example, numbers like "99. 99" are set in the portion indicating a time ("h1. m1" of the designated date of the ticket information with the identification number "T1") to indicate that this portion is not valid. The "service" field contains the identification numbers or names (e.g., ASP1, ASP2, ASP3, . . . ) of a railroad, airline, theme park, and the like for which tickets can be used. The "purchase date" field contains the date when each ticket was purchased. The "contents" field contains detailed information about each ticket, for example, the airplane name, car number, and seat number when the ticket is a railroad ticket for a train with seat reservations or an airline ticket.

FIG. 4B shows an example of how pieces of ticket information with predetermined terms of validity, e.g., coupon tickets, are stored. This example differs from that shown in FIG. 4A in that it has the "designated date" (the start date of the term of validity of ticket information in this case) field and the "end date" (the end date of the term of validity of ticket information) field, separately.

Referring to FIG. 4C, the "ticket examination for admission" field is added to ticket information like that shown in FIG. 4A. In this field, information identifying the location of the ticket gate of an entrance, e.g., the name of a ticket examination station, is written when a user enters the station or the like after ticket examination (permission of entrance is determined by the ticket examination apparatus 101) using ticket information like that shown in FIG. 4A. Although not shown in FIG. 4C, the date of entrance may be written.

A procedure for ticket examination by the portable communication terminal 100 having the arrangement shown in FIG. 3 will be described next with reference to the flow chart of FIG. 5.

Assume that the user carrying the portable terminal 100 having the arrangement shown in FIG. 3 approaches a ticket gate in a station while listening to music through a headset as another Bluetooth terminal radio-connected to the portable terminal 100. In order to check the contents of ticket information (e.g., ticket information like that shown in FIG. 4A) to be used for ticket examination for entrance to the station, the user instructs the portable terminal 100 through the designation device 1 to display the corresponding ticket information (step S1). The controller 9 reads out the designated ticket information from the ticket information storage 4 (step S2). The read ticket information is displayed on the display 6 as shown in, for example, FIG. 7 (step S3).

The radio communication connection controller 3 starts communication disconnection processing (step S4). First of all, it is checked whether the Bluetooth transceiver 8 is communicating with another Bluetooth terminal (step S5). In this case, it does not matter whether the portable terminal 100 is a master or slave. If, for example, the user is listening to music through the headset equipped with Bluetooth, it is determined that the Bluetooth transceiver 8 is in communication, and the communication must be suspended. When the communication is to be suspended, information such as the identification number of the Bluetooth terminal in communication (the headset in this case) is stored in the suspended connection point information storage 2 to resume the communication afterward (step S6). When the communication is suspended, and the Bluetooth transceiver 8 is set in the Standby mode (step S7), the Bluetooth transceiver 8 starts processing for establishing a radio channel to the ticket examination apparatus 101 (step S8). Note that if it is determined in step S5 that the portable terminal 100 is not communicating with another Bluetooth terminal, the flow skips steps S6 and S7 and advances to step S8.

When a radio channel is established between the ticket examination apparatus 101 and the portable terminal 100 (step S9), the flow advances to step S10, in which the Bluetooth transceiver 8 executes predetermined ticket examination processing by transmitting the ticket information displayed on the display 6 to the ticket examination apparatus 101 (although a description of this ticket examination processing will be omitted because it is irrelevant to the gist of the present invention, in this case, the user has ticket information as a valid railroad ticket, and it is at least checked whether the user can enter the station). As shown in FIG. 4C, then, the name of the station where ticket examination was performed is stored in the "ticket examination for admission" field in the ticket information stored in the ticket information storage 4. Thereafter, the radio channel established between the portable terminal 100 and the ticket examination apparatus 101 is disconnected (step S11). After this operation (when a predetermined period of time (time α) elapses after the communication is disconnected in step S7 or connection processing for the ticket examination apparatus 101 is started in step S8), the connection information temporarily saved in the suspended connection point information storage 2 is read out (steps S12 and S13). To resume communication with another Bluetooth terminal (the headset in this case) the communication with which has been suspended, a radio channel is established between the portable terminal 100 and the headset, and the communication is resumed (step S13). When a predetermined period of time (time β) elapses (step S14), display of the ticket information on the display 6 is terminated (step S15). For example, measurement of the time β is started after the ticket information is displayed. Note that display of the ticket information on the display 6 may be terminated after the communication with another Bluetooth terminal the communication with which has been suspended is resumed, regardless of whether the time β has elapsed.

The ticket information displayed on the display 6 is preferably kept displayed on the display 6 for a predetermined period of time after the user passes through the ticket gate or until the user inputs a instruction to terminate displaying. This, for example, allows the user to check his/her car number and seat number. Note that this value of β may be set by the user.

Even if a radio channel cannot be established between the portable terminal 100 and the ticket examination apparatus 101 for some reason in step S9, the flow advances to step S12 to try to establish a radio channel with the ticket examination apparatus 101 for a predetermined period of time (e.g., time α) until a radio channel is established (step S9). After an elapse of an time α, the flow advances to step S13 to resume the connection to another Bluetooth terminal which has been suspended.

Another procedure for ticket examination by the portable terminal 100 having the arrangement shown in FIG. 3 will be described next with reference to the flow chart of FIG. 6. Note that only the difference between this procedure and that shown in FIG. 5 will be described. The controller 9 has a timer 9a. When ticket information is displayed in step S3, the controller 9 refers to the timer 9a to check whether the designated date (or the term between the designated date and the end date) contained in the ticket information falls within the term of validity (if, for example, the ticket information corresponds to a pass or coupon ticket, it is checked whether the current date falls within the term designated by the ticket information; if the ticket information is a reserved seat railroad ticket, it is checked whether the current date and time fall within a predetermined period of time from the designated date and time) (step S20). If the designated date (or the term between the designated date to the end date) contained in the displayed ticket information falls within the term of validity, processing in step S4 and subsequent steps is performed.

The user may input an instruction to display ticket information to simply check the ticket information instead of passing through a ticket gate. Even if the user gives an instruction to display ticket information to only check the ticket information, the processing in step S4 and subsequent steps is started if it is determined in step S20 that the designated date falls within the term of validity. In this case, however, since the ticket examination apparatus 101 does not exist within the Bluetooth communication limit range from the portable terminal 100, the portable terminal 100 cannot communicate with the ticket examination apparatus 101. In the end, after attempts are made to establish connection for the time α in step S12, the controller 9 abandons connection and resumes the suspended communication with another Bluetooth terminal (step S13).

If it is determined in step S20 that the designated date falls outside the term of validity, the flow advances to step S14 to display the ticket information for the time β, and the display of the ticket information is terminated (step S15).

The above embodiment has exemplified the ticket examination processing for admission. The gist of the embodiment remains the same for ticket examination processing for exit.

As described above, according to the first embodiment, when ticket examination, fare adjustment, ticket inspection, or the like is to be performed by using the ticket information stored in the portable terminal 100, the user can start data transmission/reception for ticket examination or the like, with a higher priority being given to this data transmission/reception than to radio communication with another apparatus, by simply performing displaying operation for the ticket information to be used, which is generally performed when a ticket is to be used. Even if, therefore, the portable communication terminal is communicating with an apparatus other than a ticket examination apparatus, fare adjustment apparatus, or ticket inspection apparatus, ticket examination, fare adjustment, ticket inspection, or the like using the ticket information stored in the portable terminal 100 can be performed by simple operation that imposes no burden on the user. After the ticket examination, fare adjustment, or ticket inspection, the communication with another apparatus that has been suspended can be resumed without imposing any burden on the user.

(Second Embodiment)

Figure 8:
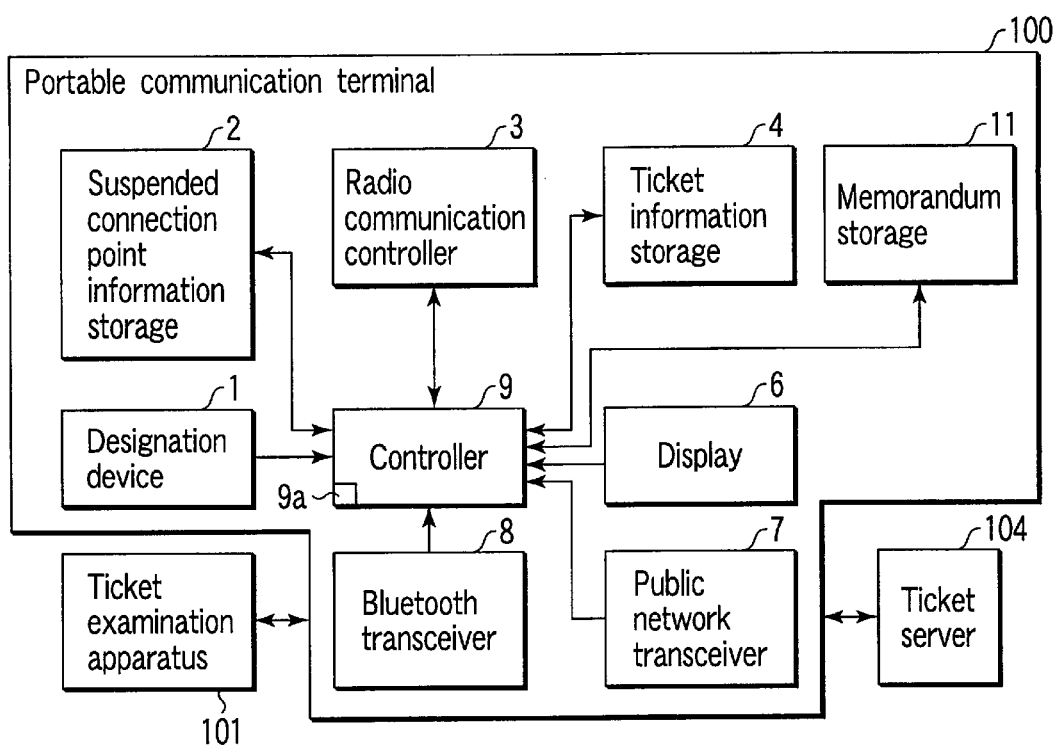
FIG. 8 is a block diagram showing another example of the arrangement of the portable communication terminal.

FIG. 8 shows an example of the arrangement of a portable terminal 100 according to the second embodiment of the present invention, which is equivalent to the arrangement of the portable terminal 100 in FIG. 3 to which a memorandum storage 11 is added. The differences between the first and second embodiments will be described below.

In the second embodiment, ticket information that becomes invalid when it is used, fare-adjusted, or expires is deleted from a ticket information storage 4. In this case, a log of the deleted ticket information which is detailed enough to allow the user to check the deleted ticket information (its contents) is stored in the memorandum storage 11.

Operation in this processing will be described below by exemplifying the case where ticket information that has become invalid when it was used is deleted from the ticket information storage 4. When, for example, ticket examination for admission is performed by using the ticket information with the identification information "T1" in accordance with the flow chart of FIG. 5 or 6, a specific ticket gate ("ST1" in this case) through which the user entered and a specific date and time ("00. 11. 04. h4. m4" in this case) when the user entered are written in the ticket information storage 4, as shown in FIG. 9A. When ticket examination for exit is performed in the same manner as for admission in accordance with the flow chart of FIG. 5 or 6, a specific ticket gate ("St1" in this case) through which the user exited and a specific date and time ("00. 11. 04. h5. m5" in this case) when the user exited are written in the ticket information storage 4, as shown in FIG. 9A.

Since the ticket information with the identification number "T1" becomes invalid at this point in time, the information is deleted from the ticket information storage 4. In this case, since the deleted ticket information may be used for some purpose (e.g., fare adjustment) afterward, part or all of the deleted ticket information is copied to the memorandum storage 11. That is, ticket information that becomes invalid when it is used is deleted as shown in FIG. 9B, and the deleted ticket information is stored in the memorandum storage 11 as shown in FIG. 10. Even if the contents of ticket information stored in the memorandum storage 11 are displayed, the user cannot pass through a ticket examination apparatus 101 because the ticket information is not valid any more.

Note that ticket information stored as a log in the memorandum storage 11 may be encrypted.

After passing through the ticket examination apparatus 101, the user can perform fare adjustment for ticket information, of the ticket information stored in the ticket information storage 4, which has expired and has not been used, within the station facilities by communicating with a fare adjustment apparatus 105 as another Bluetooth terminal. In this case as well, the portable terminal 100 operates in the same manner as in the flow chart of FIG. 5 or 6. That is, when the user makes a display 6 to display fare-adjusted ticket information, the portable terminal 100 starts communication disconnection processing in response to the displaying operation as a trigger, and then starts radio communication with the fare adjustment apparatus 105.

Even if, for example, the user gets off a train at an unintended station, the user can adjust the fare in the same manner as described above by communicating with the fare adjustment apparatus 105 as a Bluetooth terminal by simply displaying ticket information on the portable terminal 100.

As has been described above, according to the second embodiment, ticket information, of the ticket information stored in the ticket information storage 4, which has become invalid after fare adjustment, expiration, or use is deleted, and only a log of the deleted information is stored. Only valid ticket information that can be used afterward is stored in the ticket information storage 4. This facilitates selection of ticket information and the like. If ticket information that has become invalid and was deleted is required afterward (for example, fare adjustment can be performed), the user can refer to the log stored in the memorandum storage 11. This offers the user great convenience.

Ticket information used in the first and second embodiments is not specifically limited, and includes tickets for a train, bus, airplane, and the like, an admission ticket to a theater, a theme park ticket, and the like.

Figure 5:
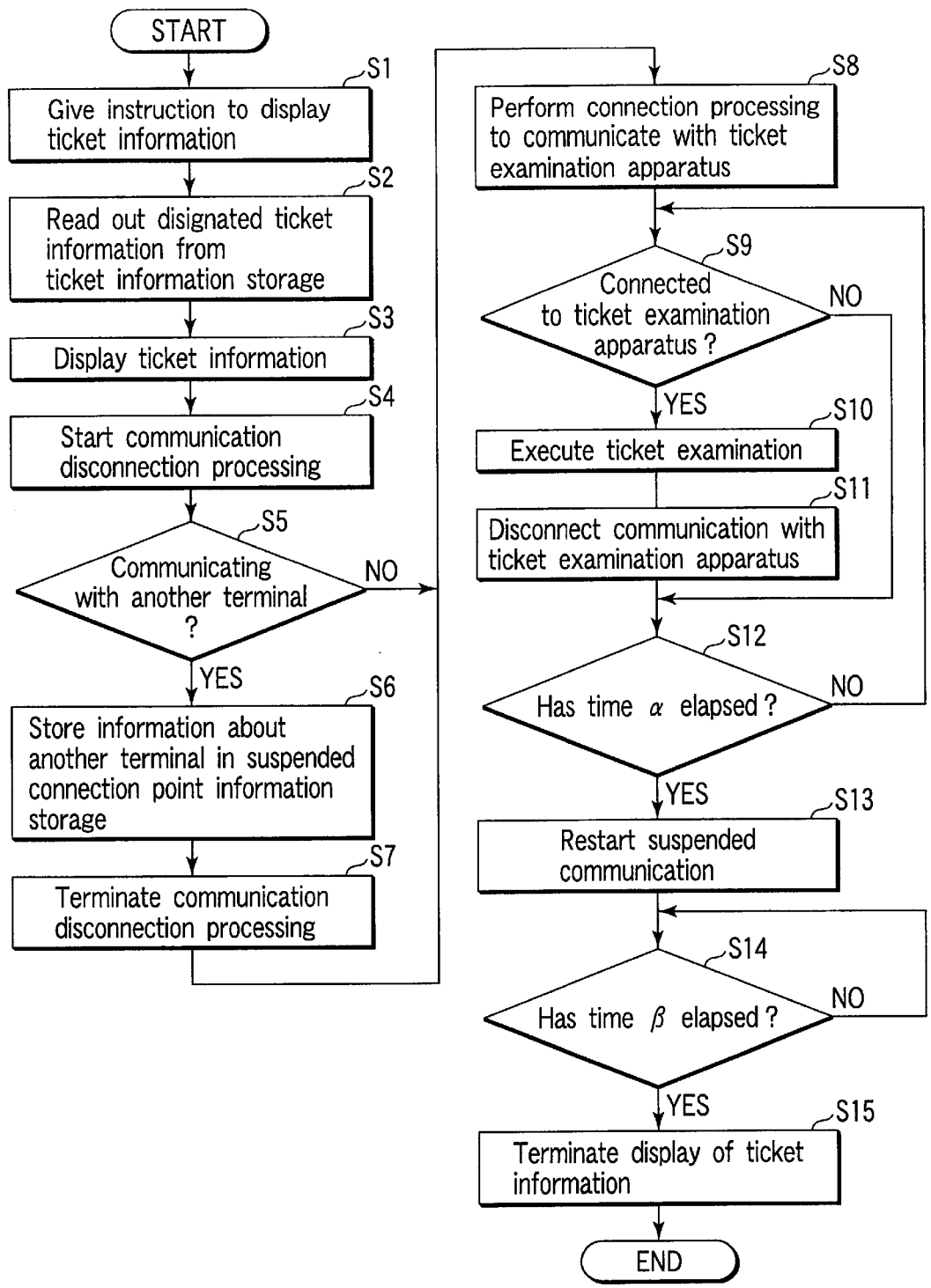
FIG. 5 is a flow chart for explaining processing in the portable communication terminal.
Figure 6:
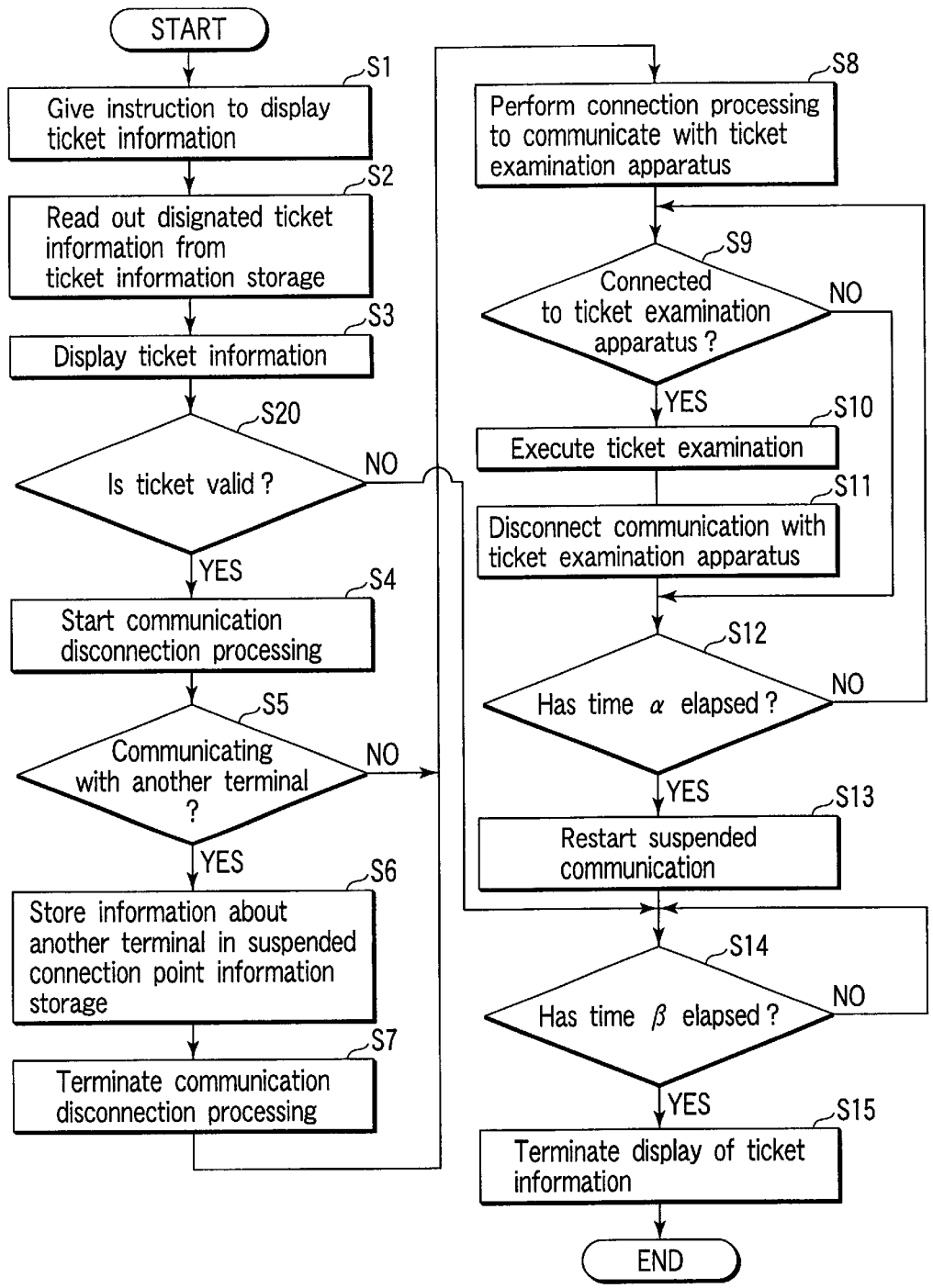
FIG. 6 is a flow chart for explaining processing in the portable communication terminal.

In step S8 in FIGS. 5 and 6, the portable terminal 100 in the Standby mode may become a master to transmit an inquiry so as to recognize the ticket examination apparatus 101 as a slave. Alternatively, the ticket examination apparatus 101 in the Standby mode may become a master to transmit an inquiry so as to recognize the portable terminal 100 as a slave. The above techniques of the present invention can be applied regardless of whether the portable terminal 100 operates as a master or slave.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data transmitting and receiving method applied to a portable communication terminal apparatus which communicates with at least one destination and a ticket gate, the method comprising:

receiving a ticket information item via a public network to obtain a plurality of received ticket information items;

storing the received ticket information items which are valid in a memory device;

deleting invalid ticket information items including an expired ticket information item from the memory device;

storing, in another memory device, records of the deleted invalid ticket information items to be used in case the invalid ticket information items are required for fare adjustment;

designating one of the ticket information items in the memory device to obtain a designated ticket information item;

displaying the designated ticket information item on a display;

establishing a first radio channel for the portable communication terminal apparatus to perform communications with the ticket gate which examines the ticket information item displayed on the display, in preference to other communications with the destination;

releasing a second radio channel which is used for communicating with the destination, before establishing the first radio channel;

communicating with the ticket gate via the first radio channel on the basis of the ticket information item displayed on the display.

2. A method according to claim 1, which includes reestablishing the second radio channel, when not establishing the first radio channel for a predetermined time; and restarting communications with the destination via the second radio channel.

3. A method according to claim 1, which includes reestablishing the second radio channel, after releasing the first radio channel; and restarting communications with the destination via the second radio channel.

4. A method according to claim 1, wherein the displaying step displays the designated ticket information item until a predetermined time elapses.

5. A method according to claim 3, wherein the displaying step displays the designated ticket information item until communications with the destination restarts.

6. A method according to claim 1, wherein the display step displays the designated ticket information item until an instruction to terminate displaying is input.

7. A method according to claim 1, wherein the first and the second radio channels are radio channels of Bluetooth.

8. A method according to claim 1, wherein the establishing step establishes the first radio channel of Bluetooth for the portable communication terminal apparatus as a master of Bluetooth to perform communications with the ticket gate as a slave of Bluetooth.

9. A portable communication terminal apparatus which communicates with at least one destination and a ticket gate, comprising:

a receiver which receives a ticket information item via a public network to obtain a plurality of received ticket information items;

a memory device configured to store the received ticket information items which are valid;

a deleting device configured to delete invalid ticket information items including an expired ticket information item from the memory device;

another memory device configured to store records of the invalid ticket information items deleted to be used in case the deleted invalid ticket information items are required for fare adjustment;

a designation device which designates one of the ticket information items stored in the memory device to obtain a designated ticket information item;

a display configured to display the designated ticket information item;

a radio channel establishing device which establishes a first radio channel to perform communications with the ticket gate which examines the ticket information item displayed on the display, in preference to other communications with the destination;

a radio channel releasing device configured to release a second radio channel which is used for communicating with the destination, before establishing the first radio channel;

a communication device configured to communicate with the ticket gate via the first radio channel on the basis of the ticket information item displayed on the display.

10. An apparatus according to claim 9, further comprising:

a radio channel reestablishing device configured to reestablish the second radio channel, when not establishing the first radio channel for a predetermined time; and, a communication restarting device configured to restart communications with the destination via the second radio channel.

11. An apparatus according to claim 9, further comprising:

a radio channel reestablishing device configured to reestablish the second radio channel, after releasing the first radio channel; and, a communication restarting device configured to restart communications with the destination, via the second radio channel.

12. An apparatus according to claim 3, wherein the display displays the designated ticket information item until predetermined time elapses.

13. An apparatus according to claim 11, wherein the display displays the designated ticket information item until communications with the destination restarts.

14. An apparatus according to claim 9, wherein the display displays the designated ticket information item until an instruction to terminate displaying is input.

15. An apparatus according to claim 9, wherein the first and the second radio channels are radio channels of Bluetooth.

16. An apparatus according to claim 9, wherein the radio channel establishing device establishes the first radio channel of Bluetooth for the portable communication terminal apparatus as a master of Bluetooth to perform communications with the ticket gate as a slave of Bluetooth.

* * * * *